United States Patent [19]

Jouen et al.

[11] Patent Number: 4,994,759

[45] Date of Patent: Feb. 19, 1991

[54] CURRENT EQUALIZING CIRCUIT

[75] Inventors: Philippe Jouen, Caen, France; José Favoretto, Campinas, Brazil

[73] Assignee: U.S. Philips Corporation, New York, N.Y.

[21] Appl. No.: 384,225

[22] Filed: Jul. 21, 1989

[30] Foreign Application Priority Data

Jul. 22, 1988 [FR] France .................. 88 09953

[51] Int. Cl.$^5$ ............................................. H03F 3/04
[52] U.S. Cl. ..................................... 330/288; 307/555; 379/400
[58] Field of Search ................. 330/288; 307/555, 567; 323/315–317; 379/400, 413, 442

[56] References Cited

U.S. PATENT DOCUMENTS 3,810,032  5/1974  Van der Plaats .................. 330/254

Primary Examiner—James B. Mullins
Attorney, Agent, or Firm—Jack D. Slobod

[57] ABSTRACT

A circuit supplies a current (I) in which the current variations ($I_L$) having been equalized according to a given relationship. In order to obtain an equalization characteristic having at least two slopes, the circuit uses the switching of the current sources ($xI_o$, $yI_o$ and $zI_o$) by means of switching stages ($T_1$, $T_2$, $T_{14}$). The output current I passing through the current output stages $T_3$ and $T_4$ thus fluctuates between two levels according to the desired equalizing relationship.

13 Claims, 4 Drawing Sheets

CURRENT EQUALIZING CIRCUIT

BACKGROUND OF THE INVENTION

The present invention has for its object to provide an equalizing circuit intended for producing an output current which has a given current characteristic as a function of the value of an input current the current characteristic having a maximum and a minimum value, which circuit comprises a means for producing a first current which is proportional to the input current, connected in series with a first current source producing a second current which is proportional to a reference current, in order to produce a first resulting current which is positive when the first current is higher than the second current and zero in the opposite case, a first switching stage arranged for being non-conductive when the first resulting current is zero, and passed through thereby when it is positive a second switching stage arranged for being passed through by the same current as the first switching stage, a second current source arranged for supplying a third current which is proportional to the reference current and connected in series with the second switching stage, in a manner such as to generate a second resulting current which is positive when the third current is higher than the resulting first current, a third switching stage arranged for not conducting when the second resulting current is zero, and passed through thereby when it is positive a first current output stage arranged for supplying a current which is equal to the current passing through the third switching stage and a second current output stage connected in parallel with the first current output stage arranged for supplying a current which is equal to the reference current, whose value is thus the said minimum value of the output current characteristic.

Such a circuit has been used for effecting a gain control of a telephone receiver, which circuit is commercially available referenced as TEA 1061.

A circuit having the same object but having a different structure has also been described in the U.S. Pat. No. 3,810,032.

The two circuits enable obtaining a current which linearly depends on an input current, between a bottom and a top limit. Such circuits are used specifically in subscriber telephone sets which are fed with a given voltage, generally 48 volts, from an exchange, the current which the subscriber terminal disposes of being smaller the more remote from the exchange the terminal is situated. In order to make the sensitivity of the telephone set independent of the length of the subscriber line and thus homogenize the listening level among the subscribers the subscriber set comprises an amplifier stage whose gain ratio depends on the current supplied and the above supply current is provided by an equalizing circuit fed by the line current, the equalization being effected according to a linear relationship as near to the theoretical curve as possible.

However, if the lines are very long and/or when moderate lengths of line sections are used, the theoretical curve stretches out over a larger dynamic range and tends to become more curved.

The above linear equalization is thus no longer sufficiently precise, which is unfavorable for certain subscriber stations.

SUMMARY OF THE INVENTION

It is an object of the invention to eliminate this disadvantage by proposing a circuit which basically provides an equalization having at least two linear regions with different slopes, in order to approach such curves more particularly but not exclusively with sufficient precision, or to approach the more conventional curves with greater precision.

The arrangement according to the invention is characterized in that it comprises at least an equalizing circuit connected in parallel with one of the first and second switching circuits and comprising on the one hand a third current source arranged for supplying a fourth current which is proportional to the reference current, connected in series with a fourth current source arranged for supplying a current in proportion to the current supplied by a first switching stage and on the other a blocking circuit arranged for connecting the fourth current source in parallel with at least one of the first and second switching circuits when the current passing through the fourth current source is larger than the fourth current.

According to an embodiment of the invention, the first switching circuit comprises a first transistor whose collector-emitter path is connected in parallel with the first current source and a second transistor whose base-emitter path is connected in parallel with the collector-emitter path of the first transistor, and the second switching stage comprises a third transistor whose base is connected to that of the first transistor. The third switching circuit may comprise a fourth transistor whose collector-emitter path is connected in parallel with the second switching stage and a fifth transistor whose base-emitter path is connected in parallel with the collector-emitter path of the fourth transistor and the first output stage may comprise a sixth transistor whose base is connected to that of the fourth transistor.

Thus the desired result is achieved with a circuit which remains simple and the parameters of the circuit (slopes, slope changes) can be adjusted without any difficulty.

According to an advantageous embodiment at least one blocking circuit comprises a first diode connected in series with the said means for supplying the first current which is proportional to the input current, and second and third diodes connected in parallel with the fourth current source. An equalization curve is thus obtained having two slopes corresponding, more specifically, with the curves drawn for the subscriber stations.

According to an embodiment, at least one blocking circuit comprises a fourth diode connected in series with the second current source and fifth and sixth diodes connected in parallel with the fourth current source.

According to a preferred embodiment, corresponding with an equalization having three slopes corresponding, more specifically, with the case of the subscriber stations, two equalizing circuits are connected in parallel with the first switching circuit.

BRIEF DESCRIPTION OF THE DRAWING

The invention will be better understood when reading the following description given by way of non-limiting example, together with the drawing Figures, in which.

DETAILED DESCRIPTION OF THE PREFERRED EMBODIMENTS

Figure 1:
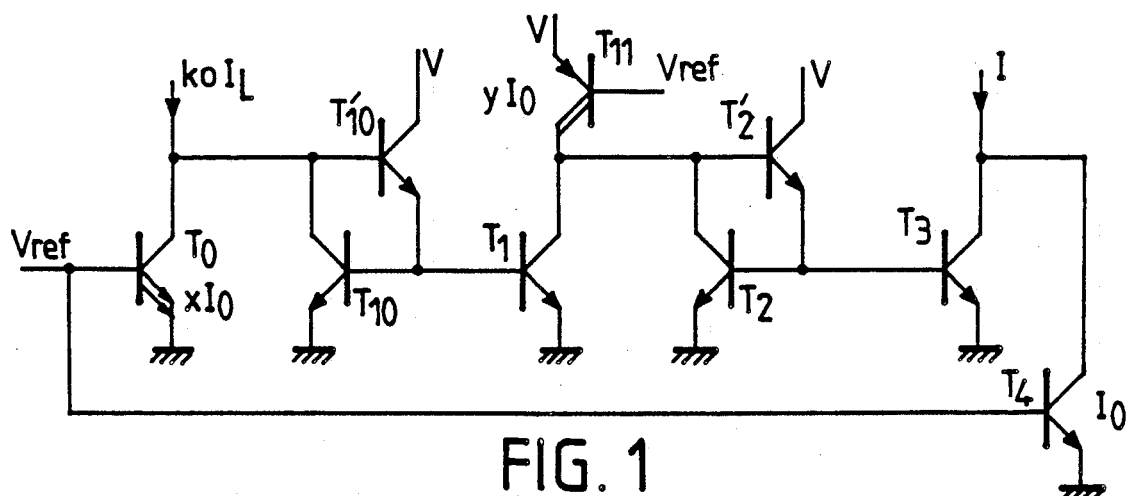
FIG. 1 shows a prior-art gain control circuit.

A gain control circuit as shown in FIG. 1 (prior art) has for its object to supply a gain control current I whose value is $I_o$ (minimum gain) when the line current attains a maximum value $I_o+yI_o$ when the line current has a minimum nominal value, and which linearly varies between these two values when the line current ranges between these two nominal values. With $y=1$ a correction dynamic of 6 dB will be obtained and 9 dB with $y=1.75$.

The circuit of FIG. 1 comprises an npn transistor $T_0$ having at least one emitter which is connected to the common mode pole (ground), a base to which is applied a reference voltage $V_{ref}$ so that its collector-emitter path is passed through by a current $xI_o$ (x being the number of emitters of the transistor $T_0$ or rather the ratio between the surfaces of the emitters of the transistors $T_4$ (cf below) and $T_0$), and a collector which is connected to a current source having a strength of $k_oI_L$. The line current received from a subscriber station and whose value depends on the remoteness of the subscriber relative to the exchange is represented by $I_L$, and $k_o$ represents a given ratio.

An npn transistor $T_{10}$ has its emitter connected to ground, its collector connected to that of $T_0$ and its base connected to that of an npn transistor $T_1$. The npn transistor $T'_{10}$ has its base connected to the collectors of the transistors $T_0$ and $T_{10}$, its emitter to the bases of the transistors $T_{10}$ and $T_1$, and its collector connected to supply a voltage source V. The transistor $T_1$ has its emitter connected to ground, its collector connected to that of an npn transistor $T_2$ and also to a current source having a strength of $yI_o$, constituted in this case by a pnp transistor $T_{11}$ which has an emitter connected to the voltage source V, the base connected to the reference potential Vref, and at least one collector connected to those of the transistors $T_1$ and $T_2$. An npn transistor $T'_2$ has its base connected to the collectors of the transistors $T_1$ and $T_2$, its emitter to the base of the transistor $T_2$ and its collector to the voltage source V. An npn transistor $T_3$ has its base connected to that of the transistor $T_2$, its emitter to ground, and its collector to that of a transistor $T_4$ whose emitter is connected to ground and to whose base is applied the voltage Vref so to constitute as a current source $I_o$. The common collector of the transistors $T_3$ and $T_4$ constitutes the output S of the circuit which forms a current source having the value I. It will be evident that the transistors $T_{10}$ and $T'_{10}$ are equivalent to a forward direction diode in the base of $T_1$, which induces a base-emitter voltage equal to $V_o$ in this transistor as long as current is available.

The circuit has three operating zones.

(a) Low $I_L$: $k_oI_L < xI_o$

The transistor $T_0$ is saturated and the transistor $T_1$ is blocked, and thus $T_2$ is conductive and is passed through by the current $yI_o$, as is the transistor $T_3$ with which it forms a current source. Thus, we have $I=I_o(1+y)$ which corresponds with a maximum gain.

(b) Intermediate $I_L$: $k_oI_L > xI_o$

The transistor $T_0$ is conductive in the normal fashion. The transistor $T_1$ is thus conductive ($k_oI_L \cdot xI_o$) and the transistor $T_2$ thus conducts the current $yI_o-(k_oI_L-xI_o)$, the same holds for transistor $T_3$.

Thus we have $I=I_o(1+y)-(k_oI_L-xI_o)$.

(c) High $I_L$: $k_oI_L \geq (x+y)I_o$

The current in $T_2$ is canceled causing the transistor $T_3$ to block.

Thus we have $I=I_o$ (minimum gain).

Figure 2:
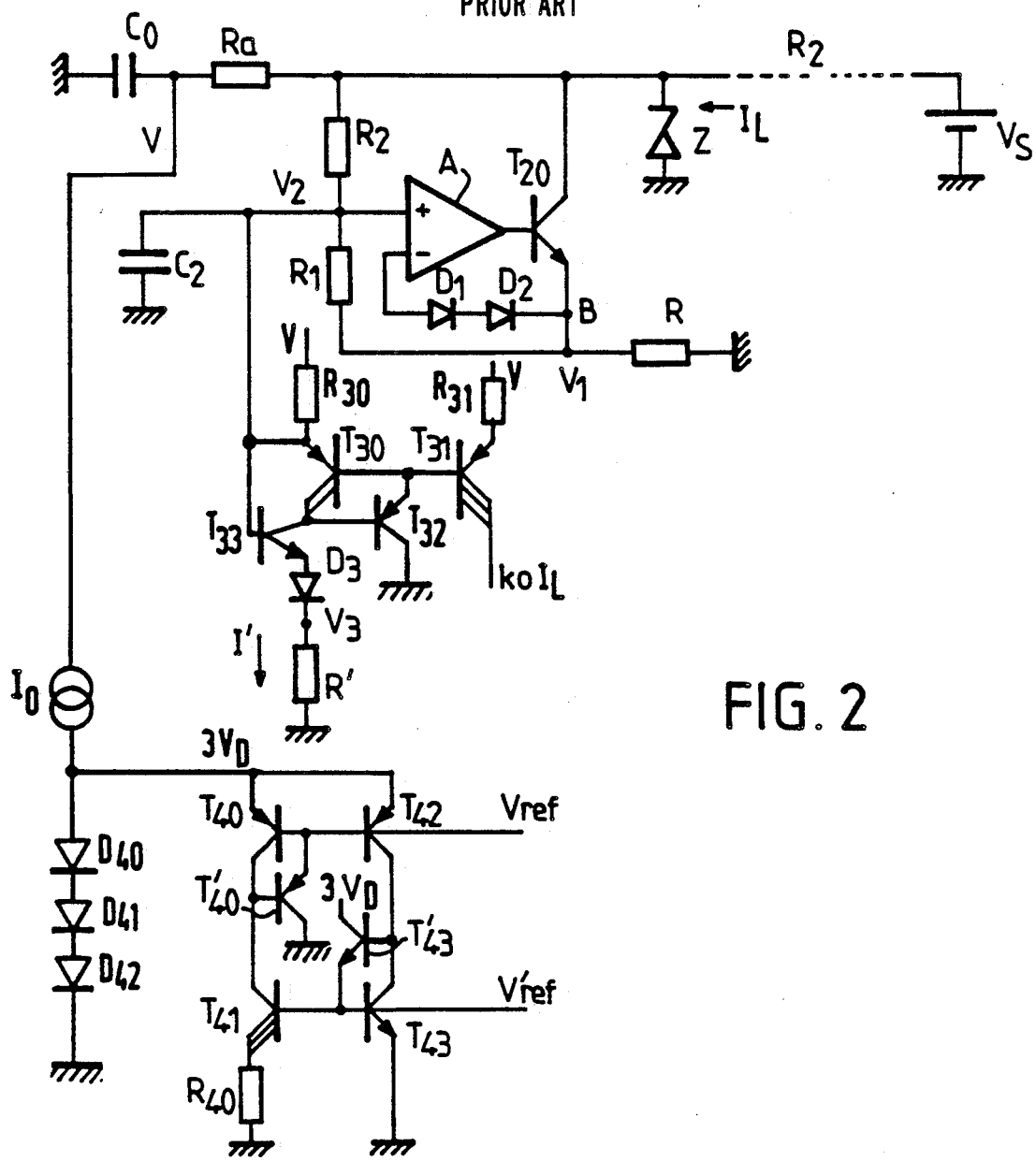
FIG. 2 shows a circuit for producing a current at a given ratio to the line current.

FIG. 2 shows a standard schematic of an arrangement diagram with which it is possible to generate a current $k_oI_L$ and a supply voltage V from a subscriber station. The exchange supplies the subscriber lines with a voltage $V_s$ of 48 V. The current $I_L$ which the subscriber receives depends on the length of the line between the subscriber and the exchange (line resistance $R_L$), and on the value of the resistance of the exchange (generally 600 Ω). A Zener diode Z is arranged at the input of the subscriber station so as to protect this station against overvoltages, and a capacitor $C_o$ of a high value (approximately 100 μf) is inserted between a terminal of an adapting resistor $R_a$ and ground. This terminal of the resistor $R_a$ provides the supply voltage V.

A resistor $R_2$ is inserted between the input of the subscriber station and the non-inverting input of an operational amplifier A. Between this input of the amplifier A and ground a capacitor $C_2$ is inserted having a high value (several μf) intended to filter out the a.c. residual component. The output of the amplifier A is connected to the base of a transistor $T_{20}$ whose collector is connected to the input of the subscriber station, and whose emitter forms a junction B with on one side a resistor $R_1$ connected to the junction B and the non-inverting input of the amplifier A, and on the other a resistor R inserted between the junction B and ground and finally connected to the cathode of one of the two diodes $D_1$ and $D_2$ connected in series between the inverting input of the amplifier A and junction B.

Assuming that $V_1$ is the voltage at junction B and $V_2$ the voltage at the non-inverting input of the amplifier A, and $V_D$ the voltage across a diode, we have:

$V_2 - V_1 = 2V_D$ $V_1 = RI_L$ $V_2 = RI_L + 2V_D$

The non-inverting input of the amplifier A is connected to the base of an npn transistor $T_{33}$ whose emitter is connected to ground across a forward direction diode $D_3$ and a resistor $R'$ respectively. The collector of the transistor $T_{33}$ is connected to the base of a transistor $T_{32}$ whose collector is connected to ground. A transistor $T_{30}$ has $n_1$ collectors connected to the base of the transistor $T_{32}$. The transistor $T_{22}$ is used because $V_2$ is connected to ground.

The emitter of the transistor $T_{30}$ is connected to the voltage V through a resistor $R_{30}$ and its base is connected to the emitter of transistor $T_{32}$ and to the base of a transistor $T_{31}$ whose emitter is connected to the voltage source V through a resistor $R_{31}$ and which has $n_2$ collectors (with $n_2 \geq 1$) which supply the current $k_o I_L$. The resistor $R'$ terminal not connected to ground has a potential of $V_3$.

We have:

$$V_3 = V_2 - 2V_D = V_1 = R I_L$$

The current $I'$ which passes through the resistor $R'$ has a value of:

$$I' = \frac{R}{R'} I_L$$

The transistors $T_{30}$ and $T_{31}$ form a current source at a ratio of $n_2/n_1$ (or more generally, at the ratio of the surfaces of their collectors).

We have:

$$k_o = \frac{R}{R'} \frac{n_2}{n_1}$$

FIG. 2 also shows an arrangement for obtaining the voltage Vref for the pnp transistor current sources (and a voltage V'ref for the pnp transistor current sources). This arrangement comprises a first branch using the collector-emitter paths connected in series of two transistors: pnp transistor $T_{10}$ and npn transistor $T_{41}$. The emitter-base path of a pnp transistor $T'_{40}$ whose collector is connected to ground being inserted between the base and the collector of the transistor $T_{40}$. A resistor $R_{40}$ is inserted between the emitter(s) of the transistor $T_{41}$ and ground. The second branch comprises in a series connection the emitter-collector paths of a pnp transistor $T_{41}$ and an npn transistor $T_{43}$ whose emitters are connected to ground. The base-emitter path of an npn transistor $T'_{43}$ is connected between the collector and the base of the transistor $T_{43}$. The emitters of the transistors $T_{40}$ and $T_{41}$, are brought to a value which is equal to three diode voltages (3 $V_D$). This voltage which is equal to 3 $V_D$ is obtained on the basis of the voltage V which feeds a current source $I_o$ which causes a current $I_o$ to flow through three series-arranged diodes $D_{40}$, $D_{41}$ and $D_{42}$. The voltage Vref is available on the interconnected bases of the transistors $T_{40}$ and $T_{41}$, and a voltage V'ref on the interconnected bases of the transistors $T_{41}$ and $T_{43}$. These values specifically depend on the value of resistor $R_{40}$.

The circuit according to the invention (FIG. 3) is distinguished from that shown in FIG. 1 in that transistor $T_{12}$ and npn transistor $T_{14}$ and diodes $D_{10}$, $D_{12}$ and $D'_{12}$ are inserted. The transistor $T_{12}$ has its base connected to the reference voltage source Vref, its emitter connected to the supply voltage source V and it has one or various collectors connected to ground through two forward direction diodes $D_{12}$ and $D'_{12}$. The transistor $T_{12}$ constitutes a current source $zI_o$, the emitter of the transistor $T_{14}$ is connected to ground and its collector is connected to that or those of the transistor $T_{12}$.

A diode $D_{10}$ is inserted between the collectors of the transistors $T_1$ and $T_{14}$, whilst its anode is connected to the collector of the transistor $T_1$. So four operating zones are distinguished:

(a) Low $I_L$: $k_o I_L < x I_o$

The transistor $T_0$ is saturated, the transistor $T_1$ is blocked as is the transistor $T_{14}$. The current $zI_o$ passes through the diodes $D_{12}$ and $D'_{12}$ and the value of the collector potential of $T_{12}$ is $2V_D$.

The transistor $T_2$ is conductive. Its collector potential value is the sum of the base-emitter voltages of the transistors $T_2$ and $T'_2$, that is, $2V_D$, which implies that the diode $D_{10}$ is blocked. The operation is thus the same as above and we have:

$I = I_o(1+y)$, which corresponds with a maximum gain.

(b) Lower intermediate $I_L$: $k_o I_L > x I_o$.

The transistor $T_{10}$ is passed through by the current $K_o I_L - x I_o$.

The transistor $T_{14}$ which has w emitters (in the drawing w=3) is passed through by the current $w(k_o I_L - x I_o)$.

The diodes $D_{12}$ and $D'_{12}$ are passed through by the current $zI_o - w(k_o I_L - x I_o)$, thus the voltage across the collector of $T_{14}$ has the value $2V_D$. The transistor $T_2$ is conductive, thus the voltage on the base of $T'_2$ and thus on the collector of $T_1$ has also the value $2V_D$. Thus the diode $D_{10}$ is blocked.

So this is the same case as with item b) of FIG. 1 that is to say, that the transistor $T_2$ conducts the current $yi_o - (k_o I_L - x I_o)$ as does the transistor $T_3$.

Thus we have $I = I_o(1+y) - (k_o I_L - x I_o)$.

The slope is equal to $a - k_o$.

(c) Higher intermediate $I_L$: w $(kI_L - 3xI_o) - zI_o > 0$.

The transistor $T_1$ conducts the current $k_o I_L - x I_o$, and $T_{14}$ conducts the current $w(k_o I_L - x I_o)$, but seeing that this current is larger than $zI_o$, the transistor $T_{14}$ tends to be saturated that is, its collector voltage tends towards $V_{CE} = 0$. Once its collector voltage attains the potential $V_D$, the diode $D_{10}$ can be conductive.

The result of this is that the transistors $T_1$ and $T_{14}$ each consume current supplied by the source $yI_o$.

The transistor $T_2$ thus conducts the current:

$$yI_o - (k_o I_L - x I_o)[w(k_o I_L - x I_o) - zI_o].$$

So we have:

$$I = I_o(1+y) - ((w+1)k_o I_L + (w+1)xI_o + zI_o.$$

The slope, equal to $-(w+1)k_o$ is larger than for item b).

(d) High $I_L$: $w(k_o I_L - x I_o) - z I_o + k_o I_L - x I_o \geq y I_o$

The transistors $T_1$ and $T_{14}$ completely consume the current $yI_o$.

The result is that the transistor $T_2$ is blocked.

So we have $I=I_o$.

Figure 3:
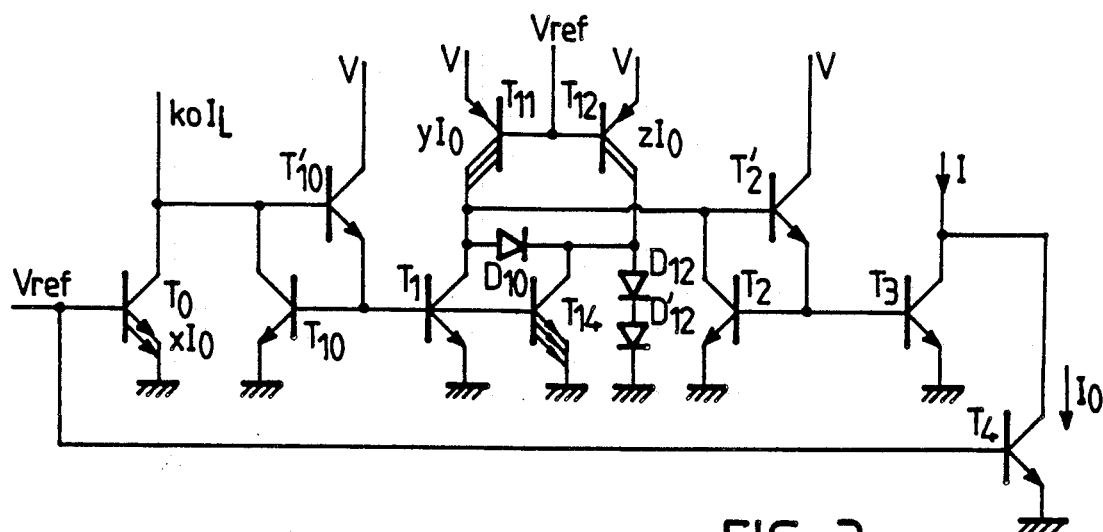
FIG. 3 shows a gain control circuit according to a first embodiment of the invention.
Figure 4:
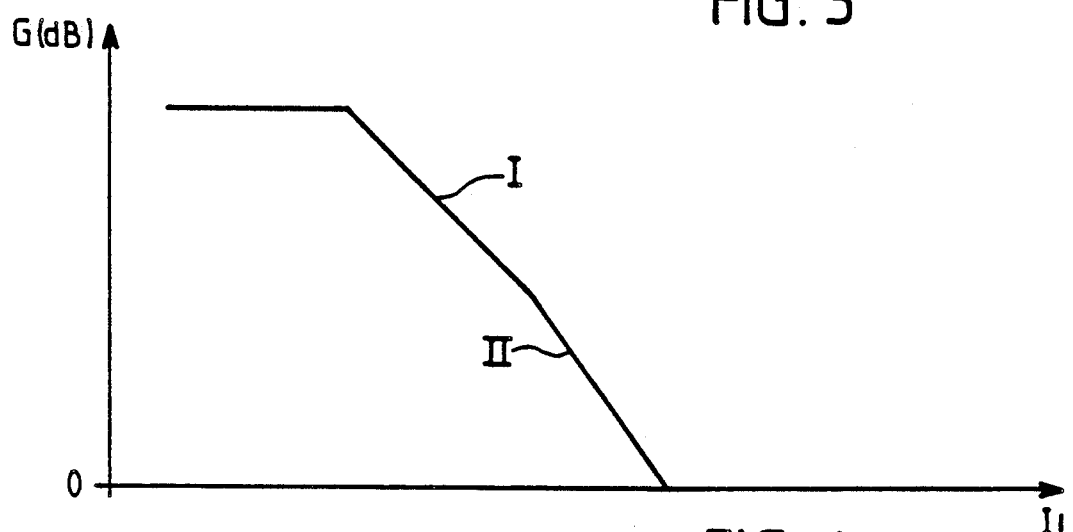
FIG. 4 shows the curves representing the gain characteristic plotted against the line current for a circuit arrangement shown in FIG. 3
Figure 5:
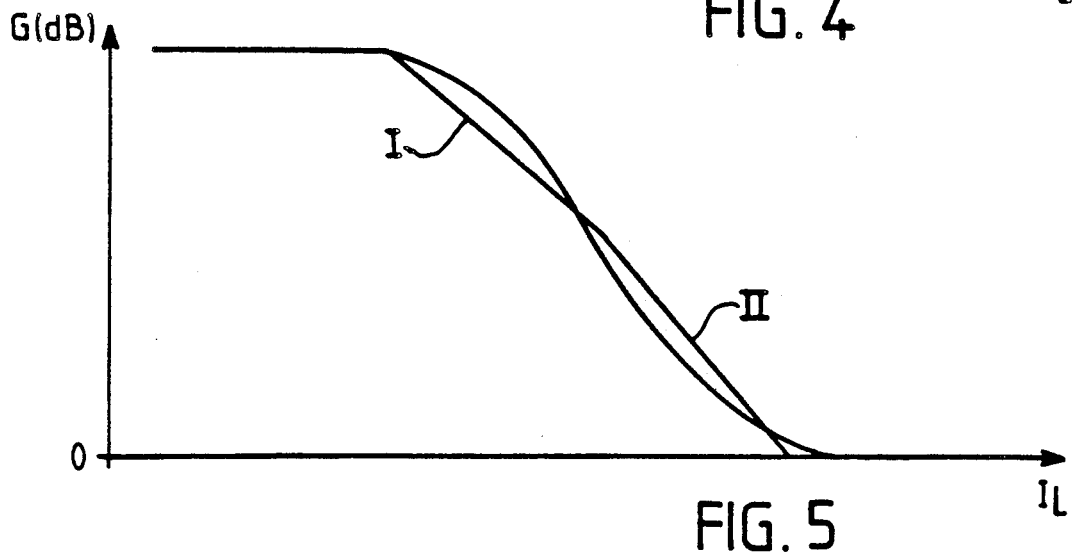
FIG. 5 shows the curve comprising two sloping lines of the circuit as shown in FIG. 3 adapted to the profile of a given equalization curve.

According to FIG. 4 the two-slope curve of the circuit as depicted in FIG. 3 shows a first part I and a steeper second part II which enables the parts to follow more accurately a characteristic correction-curve running as indicated by way of a solid line in FIG. 5. The presence of this correction curve with two slopes permits to obtain a maximum difference between the theoretical and real curves which is much smaller than with a correction curve having a single slope.

Fractionary ratios x, y and z can be obtained with the reference voltage Vref when using to this effect a circuit of the dividing current mirror type similar to the one described with FIG. 2 for obtaining the current $k_oI_L$ (transistors $T_{30}$, $T_{31}$, diode $D_3$, resistor $R'$), or more simply, by varying the surface of the emitters. In fact the numbers of the emitters have been mentioned for clarity. Evidently, the currents have the same ratios as the effective emitter surfaces.

Figure 6:
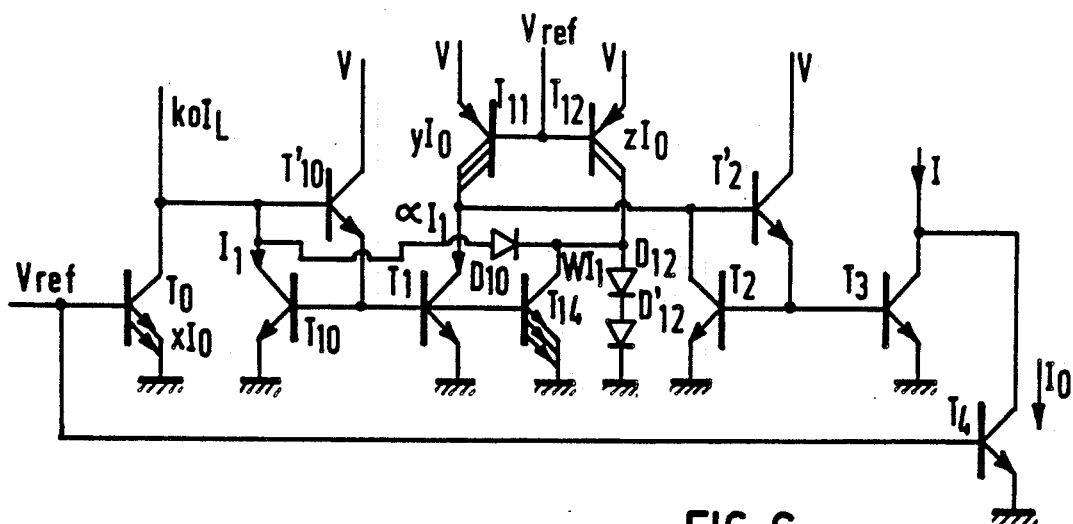
FIG. 6 shows a gain control circuit according to a second embodiment of the invention.
Figure 7:
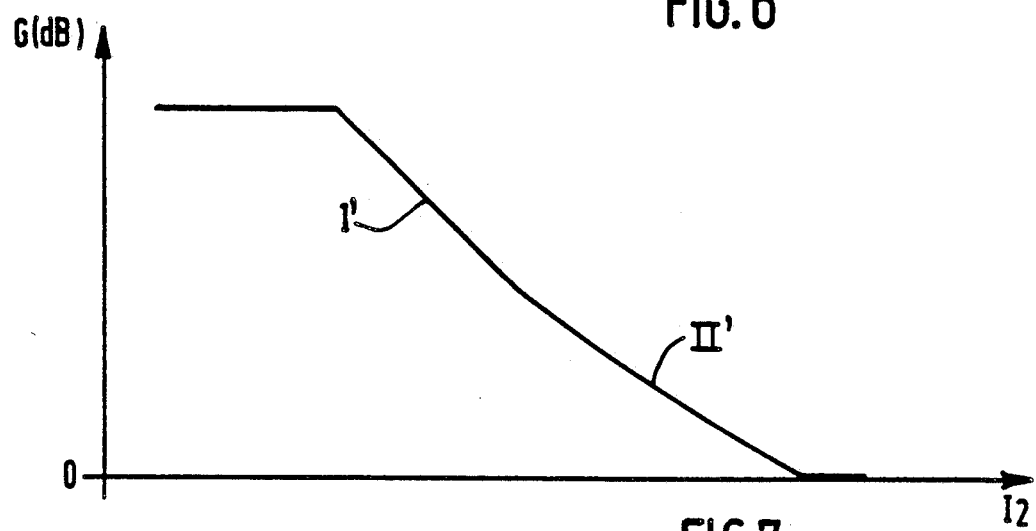
FIG. 7 shows a curve representing the gain characteristic plotted against the line current for a circuit as shown in FIG. 6

The schematic diagram of FIG. 6 comprises the same elements as that of FIG. 3 arranged in the same fashion but for the fact that the anode of the diode $D_{10}$ is connected to the collector of the transistor $T_{10}$ instead of being connected to that of the transistor $T_1$. As observed hereinbefore, four operating zones are obtained (a) Low $I_L$: $k_oI_L < xI_o$ The transistor $T_o$ is saturated. The transistor $T_1$ is blocked, as is transistor $T_{14}$. The current $zI_o$ passes completely through the diodes $D_{12}$ and $D'_{12}$. The diode $D_{10}$ is thus reversely biased.
We have
$I=I_o(1+y)$ (b) Lower intermediate $I_L$: $k_oI_L > xI_o$ and $wI_1 < zI_o$ As the current $wI_1$ passing through $T_{14}$, with $w=3$ in the drawing (because $T_{14}$ has three emitters), is smaller than $zI_o$, the diodes $D_{12}$ and $D'_{12}$ are passed by a current which is sufficient for causing a polarization of the series-conductive diode. The cathode of $D_{10}$ is thus at a potential of $2V_{BE}$. The current passing through the transistor $T_{10}$, and thus the transistor $T_1$, is not zero. The collector potential of $T_{10}$ and thus the anode potential of $D_{10}$ is $2V_{BE}$. The diode $D_{10}$ does not pass any current.
We have $I_1 = k_oI_L - xI_o$ $aI_1 = a(k_oI_L - xI_o)$ $I = I_o + yI_o - a(k_oI_L - xI_o)$ The current I decreases as a function of the line current with a slope $-ak_oI_L$ (zone I' of FIG. 7).

(c) Higher intermediate $I_L$: $k_oI_L > xI_o$ and $wI_1 < zI_o$

The diodes $D_{12}$ and $D'_{12}$ no longer receive current and the voltage of the cathode of $D_{10}$ begins to drop, thus causing the diode $D_{10}$ to be conductive. The subtracted current $k_oI_L$ thus becomes:

$xI_o + (wI_1 - zI_o) + I_1$

We have:

$I = I_o + yI_o - aI_1$ with $k_oI_L - aI_o = I_1 + (IwI_1 - zI_o)$ from which:

$$I_1 = \frac{k_oI_L - (x+3)I_o}{1+w}$$

The current I decreases with a slope which is smaller than in the preceding case b) due to the current subtracted by the diode $D_{10}$.

This slope has a value of $$-\frac{ak_o}{1+w} \quad \text{(zone II' of FIG. 7)}.$$

(d) High $I_L$: $aI_1 > yI_o$

Transistor $T_2$ is blocked as is transistor $T_3$.
We have $I = I_0$.

Figure 8:
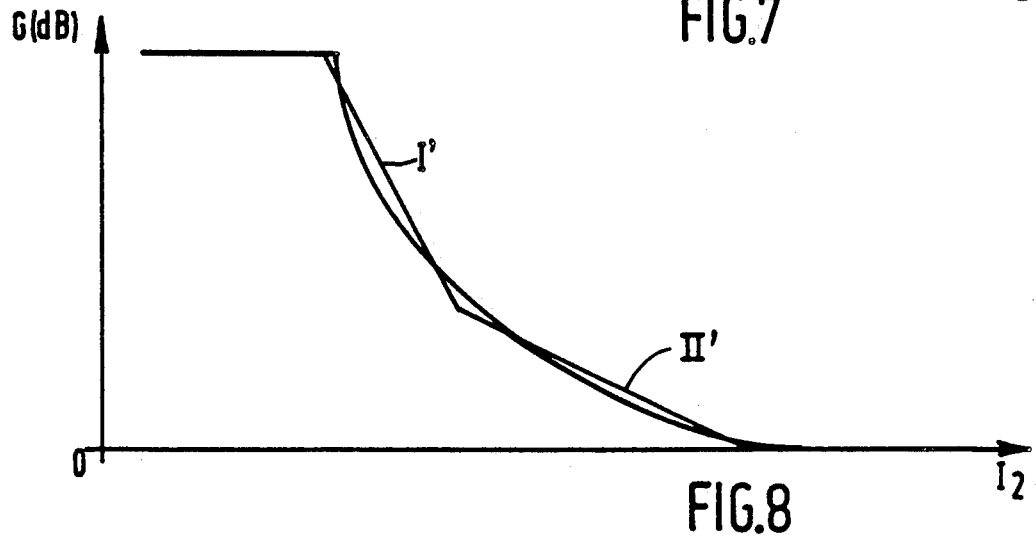
FIG. 8 shows the curve comprising two sloping lines of the circuit of FIG. 6 adapted to a given equalization curve.

FIG. 8 shows in what way a gain curve which corresponds with the case of a subscriber telephone set specifically suitable for exchanges having very remote subscribers can be approached.

Figure 9:
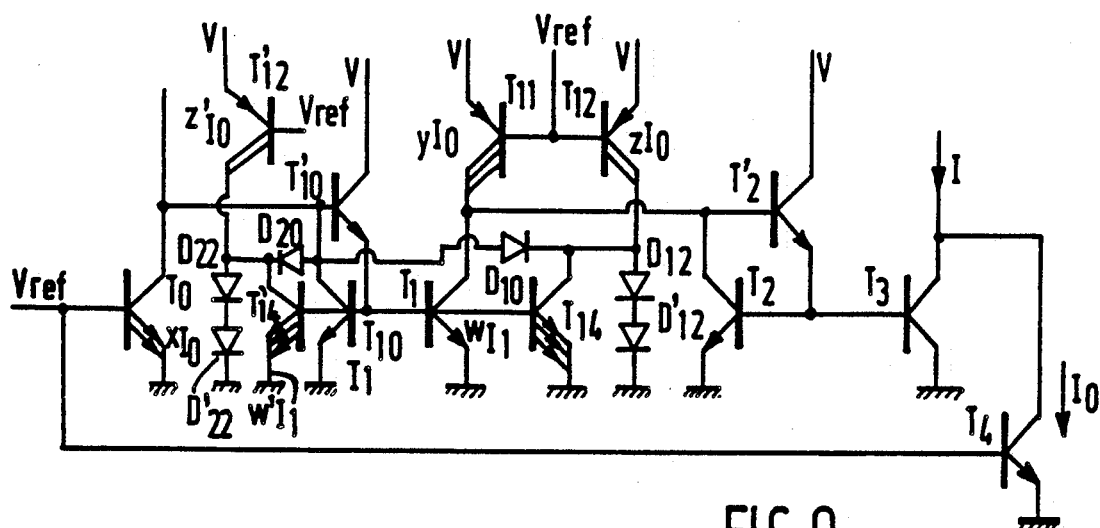
FIG. 9 shows a gain control circuit according to a preferred embodiment of the invention.
Figure 10:
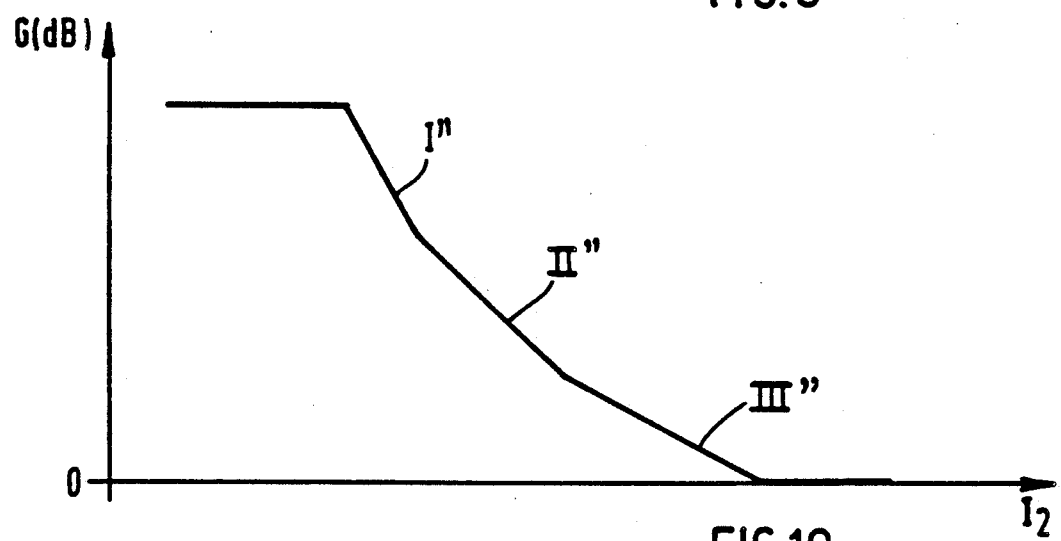
FIG. 10 shows a curve representing the gain characteristic for a circuit as shown in FIG. 9
Figure 11:
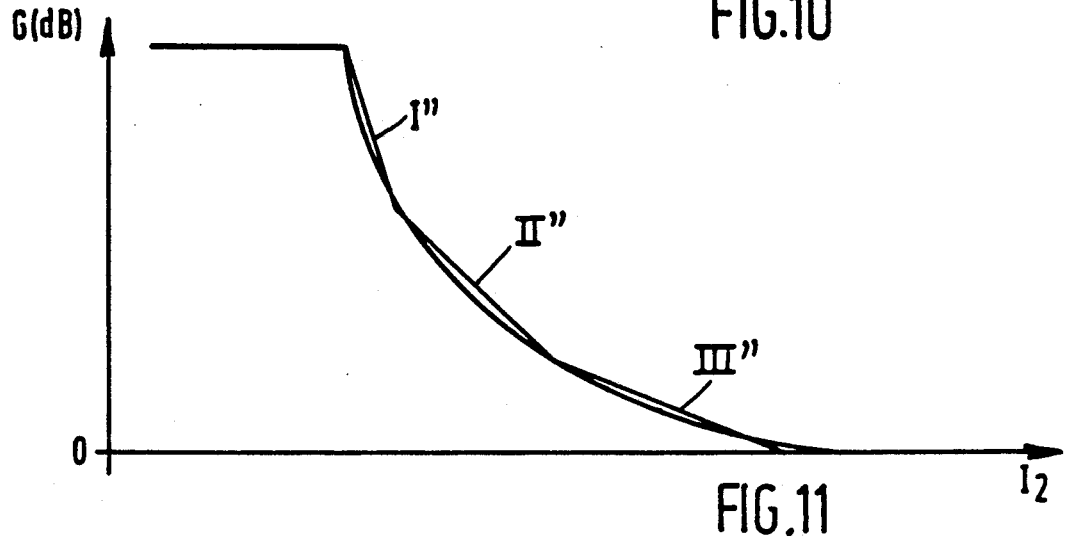
FIG. 11 shows the curve comprising three sloping lines of the circuit of FIG. 9 adapted to the profile of a given equalization curve.

The schematic diagram of FIG. 9 produces a compensation curve, shown in FIGS. 10 and 11, having three successive slopes enabling a more refined compensation than in the preceding case. From the point of view of the schematic diagram it corresponds with the embodiment of FIG. 6, plus a parallel arrangement of a novel sub-set $D_{20}$, $D_{22}$, $D'_{22}$, $T'_{14}$. The anode of the diode $D_{20}$ is connected to the collector of the transistor $T_{10}$ and the cathode of the diode $D_{20}$ is connected to the collector-emitter path of the transistor $T'_{14}$ whose emitter is connected to ground and also connected to series-connected forward direction diodes $D'_{22}$ and $D_{22}$, the cathode of $D'_{22}$ being connected to ground. The base of the transistor $T'_{14}$ is connected to those of the transistors $T_1$ and $T_{14}$.

A transistor $T'_{12}$ inserted at the current source supplies a current $z'I_o$ at the node of the collector $T'_{14}$, at the cathode of $D_{20}$ and at the anode of $D_{22}$. Thus with the aid of these two parallel arrangements we have a curve showing three successive slopes with decreasing values $$-ak_{o'} - \frac{ak_o}{(1 \times w)'} - \frac{ak_o}{1+w+w'}$$

The transistor $T_{10}$ shows by way of hypothesis a single emitter, w and w' referring to the number of emitters of the respective transistors $T_{14}$ and $T'_{14}$ (or rather the ratio of the emitter surface of this transistor to that of the transistor $T_{10}$). The choice of w, w', z and z' determines the slopes and the positions of the connecting points. The two sub-sets ($D_{10}$, $D_{12}$, $D'_{12}$ and $T_{14}$) ($D_{20}$, $D_{22}$, $D'_{22}$, $T'_{14}$) are driven consecutively and their effects added up in accordance with the same opening principle as used in the previous examples.

We claim:
1. Equalizing circuit for producing an output current as a function of the value of an input current in accordance with an output current characteristic having a maximum and a minimum value, which circuit comprises a means for producing a first current which is proportional to the input current, connected in series with a first current source producing a second current which is proportional to a reference current, in order to produce a first resulting current which is positive when the first current is higher than the second current and zero in the opposite case, a first switching stage arranged for being non-conductive when the first resulting current is zero, and passed through thereby when it is positive, a second switching stage arranged for being passed through by the same current as the first switching stage, a second current source arranged for supplying a third current which is proportional to the reference current and connected in series with the second switching stage, in a manner such as to generate a second resulting current which is positive when the third current is higher than the resulting first current, a third switching stage arranged for not conducting when the second resulting current is zero, and for being passed through thereby when it is positive, a first current output stage arranged for supplying a current which is equal to the current passing through the third switching stage and a second current output stage connected in parallel with the first current output stage arranged for supplying a current which is equal to the reference current, whose value is thus the said minimum value of the output current characteristic, characterized in that it comprises at least an equalizing means connected in parallel with one of the first and second switching circuits and comprising on the one hand a third current source ($T_{12}$) arranged for supplying a fourth current ($ZI_0$) which is proportional to the reference current, connected in series with a fourth current source ($T_{14}$) arranged for supplying a current in proportion to the current supplied by the first switching stage and on the other a blocking circuit arranged for connecting the fourth current source in parallel with at least one of the first and second switching circuits when the current passing through the fourth current source is larger than the fourth current.

2. A circuit as claimed in claim 1, characterized in that the first switching stage comprises a first transistor ($T_{10}$) whose collector-emitter path is connected in parallel with the first current source and a second transistor ($T'_{10}$) whose base-emitter path is connected in parallel with the collector-base path of the first transistor ($T_{10}$) and in that the second switching stage comprises a third transistor ($T_1$) whose base is connected to that of the first transistor ($T_{10}$).

3. A circuit as claimed in claim 2, characterized in that the third switching stage comprises a fourth transistor ($T_2$) whose collector-emitter path is connected in parallel with the second switching stage and a fifth transistor ($T'_2$) whose base-emitter path is connected in parallel with the collector-base path of the fourth transistor ($T_2$) and in that the first output stage comprises a sixth transistor ($T_3$) whose base is connected to that of the fourth transistor ($T_3$).

4. A circuit as claimed in claim 3, characterized in that said blocking circuit comprises a first diode connected in series with the said means for producing the first current which is proportional to the input current, and second an third diodes connected in parallel with the fourth current source ($T_{14}$).

5. A circuit as claimed in claim 4, characterized in that said blocking circuit comprises a fourth diode connected in series with the second current source and fifth and sixth diodes connected in parallel with the fourth current source.

6. A circuit as claimed in claim 3, characterized in that it comprises two equalizing circuits connected in parallel with the first switching circuit.

7. A circuit as claimed in claim 2, characterized in that said blocking circuit comprises a first diode connected in series with the said means for producing the first current which is proportional to the input current, and second and third diodes connected in parallel with the fourth current source ($T_{14}$).

8. A circuit as claimed in claim 7, characterized in that it comprises two equalizing circuits connected in parallel with the first switching circuit.

9. A circuit as claimed in claim 2, characterized in that said blocking circuit comprises a first diode connected in series with the second current source and second and third diodes connected in parallel with the fourth current source.

10. A circuit as claimed in claim 1, characterized in that the third switching stage comprises a first transistor ($T_2$) whose collector-emitter path is connected in parallel with the second switching stage and a second transistor ($T'_2$) whose base-emitter path is connected in parallel with the collector-base path of the first transistor ($T_2$) and in that the first output stage comprises a third transistor ($T_3$) whose base is connected to that of the first transistor ($T_2$).

11. A circuit as claimed in claim 1, characterized in that said blocking circuit comprises a first diode connected in series with the said means for producing the first current which is proportional to the input current, and second and third diodes connected in parallel with the fourth current source ($T_{14}$).

12. A circuit as claimed in claim 11, characterized in that it comprises two equalizing circuits connected in parallel with the first switching circuit.

13. A circuit as claimed in claim 1, characterized in that said blocking circuit comprises a first diode connected in series with the second current source and second and third diodes connected in parallel with the fourth current soruce.

* * * * *